Figure 1:
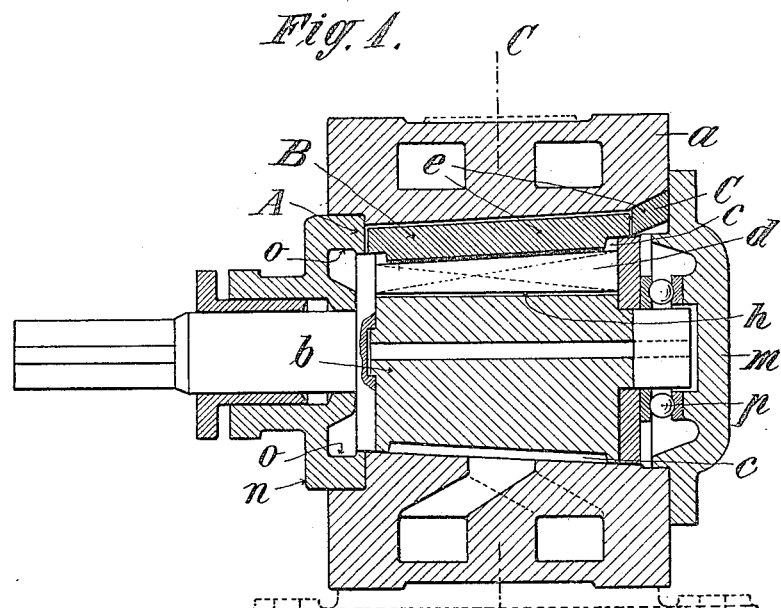

G. SILVESTRI.
ROTARY ENGINE.
APPLICATION FILED NOV. 29, 1913.

1,227,968.

Patented May 29, 1917.

Witnesses:
H. K. Breen
N. A. Small.

Inventor
Giulio Silvestri
by Wm. E. Boulter,
his Attorney.

UNITED STATES PATENT OFFICE.

GIULIO SILVESTRI, OF VIENNA, AUSTRIA.

ROTARY ENGINE.

1,227,968.  Specification of Letters Patent.  Patented May 29, 1917.

Original application filed October 28, 1912, Serial No. 728,115. Divided and this application filed November 29, 1913. Serial No. 803,701.

*To all whom it may concern:*

Be it known that I, GIULIO SILVESTRI, a subject of the Emperor of Austria, residing at Vienna, in Austria, have invented certain new and useful improvements in Rotary Engines, of which the following is a specification.

The present application is a division of my co-pending application filed October 28, 1912, Ser. No. 728115.

The invention forming the subject matter of the present application is an improvement in rotary engines operated by an expansible fluid.

A defect of rotary engines having pistons radially displaceable in the rotatable piston drum and more especially when operating as a motor driven by an expansible fluid, resides in the inadequacy of the packing. The conical form of the rotatable piston drum which is ground into the stator casing heretofore proposed for remedying the above defect only partially remedies the same. This is due to the fact that as the piston passes over the packing piece which separates the inlet side of the working chamber from the outlet side thereof transitory leakages occur at the ends of the guide slots for the pistons in the piston drum, since these ends periodically cover the joints at the ends of the packing piece between the latter and the stator casing.

The present invention remedies the above-mentioned defect of rotary engines of the above-described type with conical piston drums by causing the packing to protrude beyond the faces of the pistons which faces are parallel to the plane of rotation of the piston drum, whereby the joints there are covered.

Figure 2:
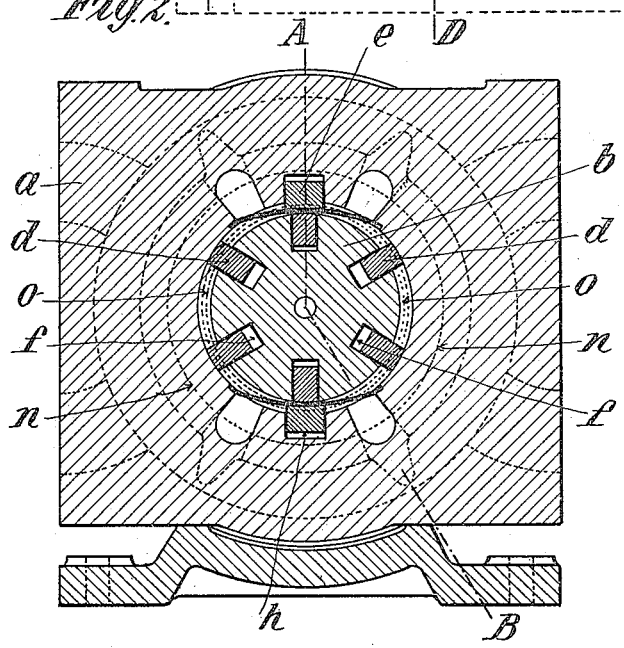

The drawing illustrates the invention and in said drawing:

Figure 1 is a section on the line A—B of Fig. 2, and Fig. 2 is a section along line C—D of Fig. 1.

Rotatably mounted in the stator casing $a$, is the conical piston drum $b$, which is provided with the annular working chamber $c$. $d$ are a plurality of pistons slidingly arranged in radial slots $f$, in the drum. Said pistons are longer in the direction of the axis of the drum than the working chamber for the purpose of providing a good fluid-tight joint between the piston drum with its guide slots and the surfaces perpendicular to the plane of rotation of the piston drum.

The packing piece $e$, which separates the inlet side of the working chamber from the outlet side is let into a longitudinal groove $h$, of the casing, and, as shown, two such packing pieces $e$, and six pistons $d$, are provided.

According to the present invention, these packing pieces are so dimensioned that they extend on both sides beyond the end faces of the piston guide slots which are parallel to the plane of rotation of the piston drum, and so cover the joints at these points even when the piston guide slots pass over the packing pieces.

The packing pieces $e$, completely effect a fluid-tight joint at the lateral end faces of the piston guide slots even with the piston pressed back by said packing pieces.

For the purpose of facilitating the insertion and fitting of the packing piece the latter is constructed as a packing fillet extending the entire length (depth) of the casing $a$, and slightly wedge-like converging in the direction of the convergence of the conical drum, which packing after being fitted in the groove $h$, of the casing has its portions B and C, so divided that the divisions are situated outside the end surfaces of the pistons.

The cover $n$, of the casing forms part of the packing, said cover closing that end of the drum $b$, which is of less diameter and insuring fluid-tightness at the smaller end of the piston. Said cover has a portion A integral with said cover which is utilized as a packing.

Where, as illustrated and in practice is usual, two or more packing pieces are provided, each portion A in one with the cover must be fitted accurately into the corresponding groove $h$, provided in the casing for the reception of the packing piece. In order to avoid this, each portion A is preferably integral with a single ring flange $o$, on the cover $n$, which is let into the casing $a$, for a distance to enable it to close the grooves $h$, of the casing and engage fluid-tightly over the opposing end of the piston drum $b$ and in such manner closes the opposing ends of the grooves $h$, for the reception of the packing pieces.

After the parts B have been inserted and the piston drum introduced, the parts C are inserted and held in position by the cover *m*. It is obvious that the parts B of the packing pieces can follow all movements of the piston drum in an axial direction, and consequently the covering of the joints at the ends of the piston guide slots is permanently assured.

As the cover *m*, of the casing has to receive the pressure exerted in an axial direction, a ball-bearing *p*, is arranged between the said cover and the piston drum for the purpose of reducing friction.

What I claim is:

1. In a rotary engine the combination with a stator casing and a rotatable piston drum therein, said drum being of less diameter at one end than the other, of pistons radially displaceable in the said drum, a packing device separating the inlet side of the working chamber of the drum from the outlet side thereof, said packing device being divided into a plurality of parts, one of said parts serving as the actual packing piece and extending beyond both end faces of the guide slots for the pistons, which faces are parallel to the plane of rotation of the piston drum, and a cover for the casing at that side adjacent to the smaller end of the piston drum and being provided with an inner ring flange, and with a portion integral with said flange serving as a packing in the manner and for the purpose set forth.

2. In a rotary engine, the combination with a stator casing and a rotatable piston drum therein, said drum being of less diameter at one end than at the other, of pistons radially displaceable in the said drum and being longer in the direction of the axis of the drum than the working chamber, a packing device separating the inlet side of the working chamber of the drum from the outlet side thereof, said packing device being divided into parts B and C, the part B serving as the actual packing piece and extending beyond both end faces of the guide slots for the pistons, which faces are parallel to the plane of rotation of the piston drum, and a cover A for the casing at that side adjacent to the smaller end of the piston drum, said cover forming part of the packing, the said parts A, B, C being so constructed that the lines of division between them are situated outside the end surfaces of the drum.

In testimony whereof I affix my signature in presence of two witnesses.

GIULIO SILVESTRI.

Witnesses:
WILHELM BERGER,
AUGUST FUGGER.

Copies of this patent may be obtained for five cents each, by addressing the "Commissioner of Patents. Washington, D. C."